Aug. 11, 1964  E. BERGEY ETAL  3,144,573
TEMPERATURE RESPONSIVE MAGNETIC COUPLING
Filed March 3, 1961
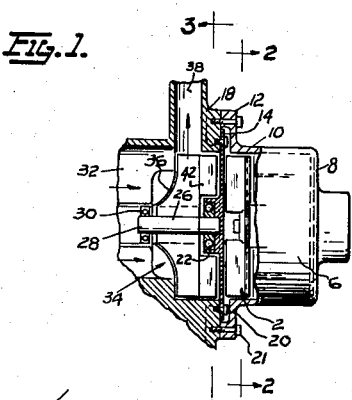
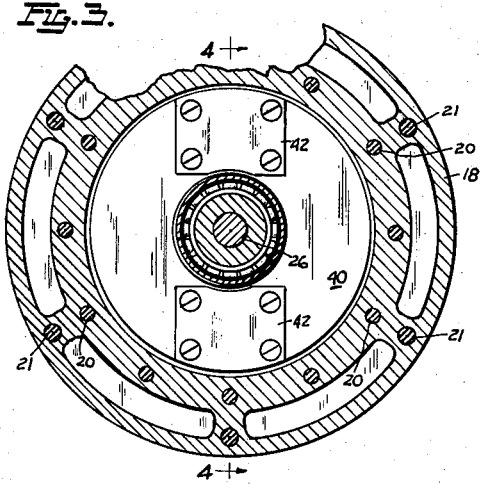
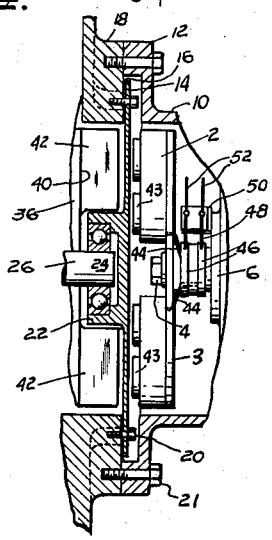
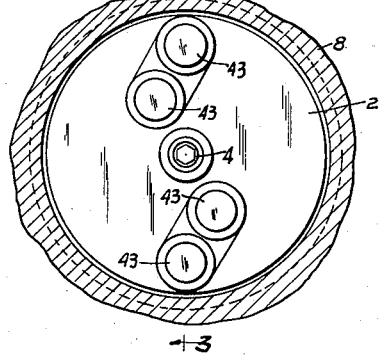
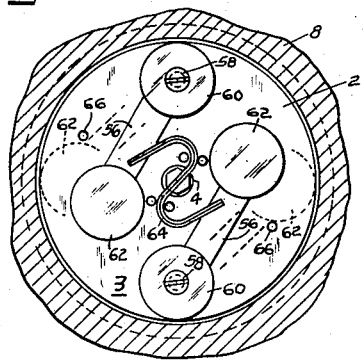
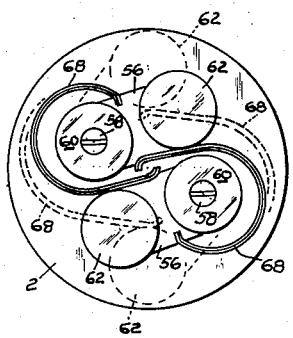
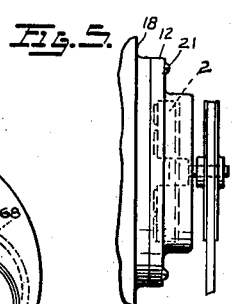
INVENTORS
ELLWOOD BERGEY
ADOLPH F. GRAF von SODEN
BY
ATTORNEY

United States Patent Office 3,144,573
Patented Aug. 11, 1964

3,144,573
TEMPERATURE RESPONSIVE MAGNETIC COUPLING
Ellwood Bergey, 1068 Hornblend St., Pacific Beach, Calif., and Adolph F. Graf von Soden, Pacific Beach, Calif. (3909 Riviera Drive, San Diego 9, Calif.)
Filed Mar. 3, 1961, Ser. No. 93,086
4 Claims. (Cl. 310—94)

This invention relates to a magnetically actuated drive that may be used for rotating a circulation producing member, such as a pump impeller or the like, and more particularly to a fluidic mass pumping apparatus, adapted for securing a fluid circulation by means of a suitably controlled drive having a magnetic force and pressure.

Manifestly, an object of the invention is to provide a prime mover in form of a motor, said motor having a shaft to which a magnetically actuating means are connected or mounted thereon, also, said prime mover having said magnetically actuating means arranged and positioned in close proximity to an activating plate of a second unit to which a pump impeller is attached or made an integral part thereof, so that in operation and when turning said magnetically actuating means, the magnetic force or power stored or imparted therein will cause said activating plate of the second unit to rotate, thus providing a direct motion between said first and second active elements, causing said pump impeller to maintain its revolution in pumping and circulating the fluidic mass.

Another object of the invention is to provide said pump impeller and said driving unit with means, that will drive said impeller at a desired speed and load and without any physical contact therewith, or therebetween.

A further object of the invention is to provide said magnetically actuated drive with means, for increasing and for decreasing the magnetic flux, that may be applicable for securing a suitable drive or a driving force for a given or another rotating element.

Another object of the invention is to provide said magnetically actuating drive with a suitable thermionic binary element, adapted for developing certain magnetic properties and for altering certain magnetic conditions, so that a second element having none of the magnetic characteristics and when disposed in close proximity thereto, will assume and maintain a magnetically influenced action or rotation in the same direction and under a load.

Another object of the invention is to provide said magnetically actuated drive with a plurality of magnetically influenced members, also, having a set of bimetalic elements associated therewith, so that in operation, a uniform and marked increase of the magnetic force may be secured for driving a second unit or element, which is or may be within the path of rotation of the magnetically actuated drive.

The invention also has for its objects to provide such means that are positive in operation, convenient in use, easily installed in a working position and easily disconnected therefrom, economical in manufacture, relatively simple and of general superiority and serviceability.

The invention also comprises novel details of construction and novel combinations and arrangements of parts, which will more fully appear in the course of the following description.

Reference is now had to the accompanying drawings, in which the similar reference characters denote the same parts.

In the drawing:

FIG. 1 shows a fragmentary sectional and partly elevational view of the magnetically actuated apparatus, showing same connected to a water pump.

FIG. 2 shows an enlarged fragmentary sectional and partly fragmentary view of the magnetic element, showing same taken on lines 2—2 from the FIG. 1.

FIG. 3 shows another enlarged fragmentary sectional view of the driven element of a pump, showing same on lines 3—3 of the FIG. 1.

FIG. 4 shows a fragmentary vertical and sectional view of the magnetically actuating apparatus, taken in the direction of the arrows 4—4 of the FIGS. 2 and 3.

FIG. 5 shows a side view of the magnetically actuating apparatus, having a driving unit composed of a pulley driven by a belt, showing same in a modified form.

FIG. 6 shows a fragmentary sectional view and partly front view thereof disclosing said magnetic elements, showing same in a modified form.

FIG. 7 shows a front view of the magnetic elements, showing same in another modified form.

Describing the invention more in detail, said invention comprises a magnetic plate assembly 2, consisting of a circular disc plate 3 which is mounted upon a shaft end 4 of a suitable motor 6.

Said motor 6 is disposed within a housing 8 which is provided with a front housing extension 10, having a suitable flange 12 for mounting same upon a pump housing or frame.

Said front housing extension 10 is adapted for housing therein said magnetic plate assembly 2, while said flange 12 is arranged for housing and holding in place a closure diaphragm 14 which encloses the opening in said pump housing, the outer edges of which commensurate with the inner recess of said flange 12, having also a suitable ring gasket 16 disposed therein, which are held in place and upon said pump housing or frame 18 by means of screws 20.

Said flange 12 is mounted on and attached to said pump frame 18, as shown, and is held thereon in place by means of bolts 21.

The diaphragm 14 is provided with a center hub member 22, wherein a suitable bearing is mounted and adapted for receiving therein the front end 24 of the shaft 26, while the rear end 28 of said shaft is mounted in and supported by a bearing 30 disposed at the inlet section 32 of the pump 34.

Said shaft 26 is provided with an impeller 36, directing the fluid flow into the pump outlet section 38, said impeller having a front plate 40 the outer side of which is provided with a pair of metalic blocks 42.

Each of said blocks 42 may be made detachable, as shown, or may be made an integral part of said plate 40, and each block when in pairs or multiple in pairs, are arranged diametrically opposed to each other.

It may be noted, that said front plate 40 of said impeller 36 may, if so desired, be provided with any desired number of said blocks 42 and that said impeller may be balanced for securing a smooth operation of the apparatus.

Said shaft end 4 is provided with said plate assembly 2, which comprises said circular drive plate 3 upon which a pair of solenoids 43 are mounted and energized by the electrical current passing thereto by means of wire connections 44, which lead to and are connected with a set of slip-rings 46 having suitable brushes 48 in contact therewith, which are mounted on a panel 50 and to which a pair of electric current carrying wires 52 are connected.

In operation, when the electric current is applied and the motor member 6 assumes a revoluble motion, or, when said assembly plate 2 is driven by a pulley and belt as shown in FIG. 5 and the electrical current is applied to said wires 52, then said solenoids 43 become energized, causing the magnetic flux to pass between the poles, and causing said blocks 42 to become influenced, although disposed at the opposite side of said diaphragm 14 which is made, in a preferred form out of Bakelite, plastic or other non-conductive material, the magnetic force secured by said solenoids 43 will pull said blocks 42 of said impeller 36 in the direction desired.

Therefore, by varying the flow of the electrical current into said solenoids 43, the speed of the impeller 36 may be varied accordingly, so that under heavy loads the motor 6 may be operated normally and without the danger of overheating, and also the motor trouble may be then prevented.

As shown, said solenoids 43 are rigidly mounted upon said circular drive plate surface of said plate assembly 2, thus allowing the magnetic flux to flow between the slightly exposed solenoid ends from one pole to another, which will have a direct and influencing effect upon the entire surface of the blocks 42 disposed upon the other side of said diaphragm 14 and in close proximity thereto.

In FIGS. 6 and 7 said plate assembly 2 is provided with said circular drive plate 3 having upon the surface thereof a set of pivoting magnetic plates 56 are secured in pivotal position by means of suitable pivot pins 58.

Said magnetic plates 56 are each provided with a pair of suitable permanent magnetic blocks 60 and 62, and which are so mounted and positioned thereon, so that the magnetic pull or force may concentrate at the center section of said drive plate 3 and thereby be more effectual upon the lower and close to the center positioned surface sections of said metalic blocks 42 mounted on said plate 40, and thereby securing a greater and more even distribution of the magnetic force, when the apparatus is in use and operation.

When said plate 3 is in motion, the thermionic heat generated therein will cause the bimetalic elements 64 to expand uniformly from their normally set position, as shown, which will cause said magnetic blocks 62 to swing uniformly, the pivotally outward position of which may be restricted by means of suitably positioned stop pins 66, as illustrated in FIG. 6.

The modification in FIG. 7 shows the bimetalic element ends 68 mounted at one edge of one plate 56 while the free end thereof rests against the magnetic block 62 of the second plate, thus pivoting same outwardly, as shown in dotted lines.

The central position of said magnetic blocks 62 as shown in FIG. 6, and the concentrated position of said magnetic blocks 60 and 62 as shown in FIG. 7, when mounted on said drive plate 3 of said assembly plate 2 of the apparatus, will have a concentrated magnetic force effect upon the lower and closer to the center section of said blocks 42 of the impeller member 36, so that when said bimetalic elements 64 and 68 expand from their normally set position, as shown in dotted lines, the expanding uniform motion will carry the respective magnetic blocks 62 into their outermost positions, thus extending the magnetic pull and force to the outer edges of said activated blocks 42 for causing a greater pull and preventing slippage.

While this invention is described in great particularity, it will be clear that the same may be modified throughout a wide range.

Accordingly, it is not proposed that this invention be limited to the exact details in construction herein shown on the drawings and described in the specification, and that reservations of the rights in practice are made, to the end that the necessary changes and modifications may be made therein, which may come within the scope of the appended claims.

We claim as our invention:

1. In a magnetic drive plate assembly of the class described, comprising a circular plate, a pair of magnetically influenced elements pivotally mounted on the surface of said circular plate, and bimetalic elements interconnecting said pivotally mounted magnetically influenced elements for directing and for uniformly controlling the pivotal position thereof, when subjected to a thermionic heat produced by the electrical current passing thereto and during the operation of said drive plate assembly, substantially as described.

2. In a magnetic drive plate assembly of the class described comprising, a circular plate, a plurality of magnetically influenced elements pivotally mounted on said circular plate and disposed close to the center thereof, means in close proximity to the periphery of said circular plate for restricting the pivotal movement of said pivotally mounted elements, and means connecting said pivotally mounted elements for uniformly controlling said pivotally actuating positions of said element means.

3. In a magnetic drive plate assembly of the class described comprising, a circular plate, a pair of magnetic plates pivotally secured upon the surface of said plate, a plurality of magnetically influenced elements upon said magnetic plates and each at the extended end thereof, means in close proximity to the periphery of said circular plate and diametrically opposed in position thereon for restricting the outward pivotal movement of said pivoting magnetic plates, and bi-metalic element means connecting said pair of pivoting magnetic plates for uniformly extending at least two of said magnetically influenced elements toward said periphery of said circular plate in said drive plate assembly.

4. In a magnetic drive plate assembly of the class described, as defined in claim 3, wherein at least two of said magnetically influenced elements are pivotally positioned upon the surface of said circular plate and in close proximity to the center section thereof for securing a central magnetic intensity and thereby impressing same upon a driven plate disposed in close proximity thereto.

References Cited in the file of this patent

UNITED STATES PATENTS

| | | |
|---|---|---|
| 2,444,687 | Widakowich | July 6, 1948 |
| 2,669,668 | Okulitch et al. | Feb. 16, 1954 |

FOREIGN PATENTS

| | | |
|---|---|---|
| 65,594 | Switzerland | Mar. 26, 1913 |